Oct. 12, 1971   E. M. NEWSOME   3,611,645
FEED MECHANISM
Filed Oct. 23, 1969   2 Sheets-Sheet 1
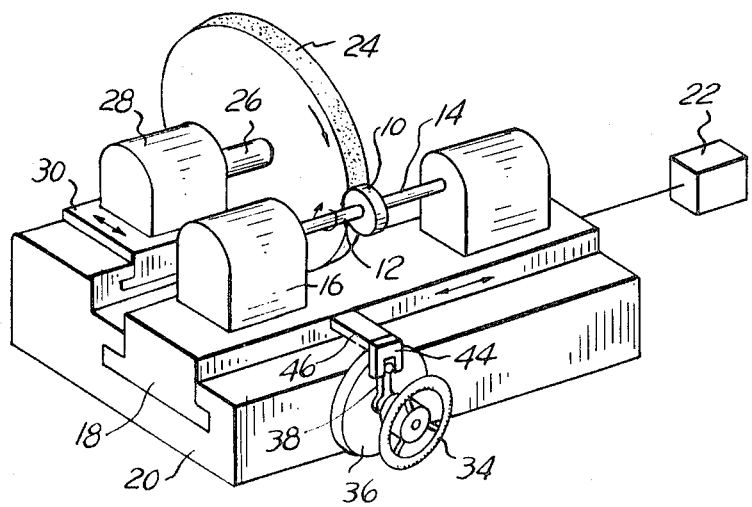
FIG. 1
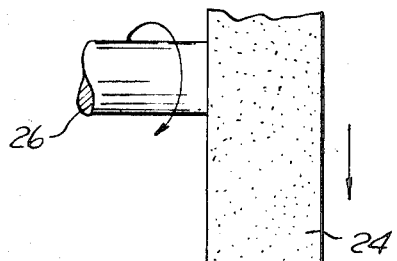
FIG. 2
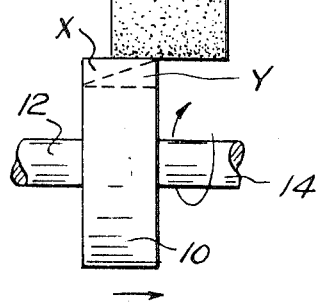
INVENTOR
EDWARD M. NEWSOME
ATTORNEYS

INVENTOR
EDWARD M. NEWSOME

ATTORNEYS

United States Patent Office 3,611,645
Patented Oct. 12, 1971

3,611,645
FEED MECHANISM
Edward M. Newsome, Anchorville, Mich. (25700 D'Hondt Court, Chesterfield Township, Mich. 48043)
Filed Oct. 23, 1969, Ser. No. 868,713
Int. Cl. B24b 51/00
U.S. Cl. 51—165.86
2 Claims

ABSTRACT OF THE DISCLOSURE

The advance or feed of a grinding wheel into a laterally traversing workpiece is actuated by and proportional to such traversing motion. Lateral movement of the workpiece-supporting traversing table causes a ratchet arm to pivot about the drive shaft which controls the feed of the grinding wheel, and a pawl on the ratchet arm engages a ratchet wheel keyed to the drive shaft to rotate the drive shaft. An adjustable shield between the pawl and the drive shaft controls when, during the stroke of the traversing table, the pawl drops into the ratchet wheel, to thereby control the depth of advance during a given cycle of the traversing table.

BACKGROUND OF INVENTION

The grinding of cutting tool inserts and the like is an operation which requires dimensional precision and cautious control of the rate of feed of the grinding wheel into the workpiece. Too rapid a feed or too great a grinding pressure can result in crumbling of the cutting edge of the workpiece. Furthermore, excessive feed rates or pressures may result in gouging and excessive wear of the grinding wheel itself.

In the grinding of cutting tool inserts, for example, the cutting tool workpiece is commonly mounted on a table which traverses the workpiece laterally relative to the grinding wheel, that is, parallel to the axis of grinding wheel rotation. The grinding wheel itself is also capable of movement into or away from the workpiece, to control the depth of cut or grind. This latter movement of the grinding wheel is therefore on an axis which is perpendicular to the line of movement of the traversing mechanism.

The primary object of this invention is to provide a reliable and precise control on the rate of advance of the grinding wheel into the workpiece, to reduce the danger of damage to the workpiece or excessive wear of the grinding wheel.

BRIEF DESCRIPTION OF THE DRAWINGS

FIG. 1 is a simplified perspective view of the grinding machine of this invention.

FIG. 2 is a fragmentary plan view on an enlarged scale of the spindle-mounted workpiece and a portion of the grinding wheel.

DETAILED DESCRIPTION OF THE INVENTION

Figure 3:
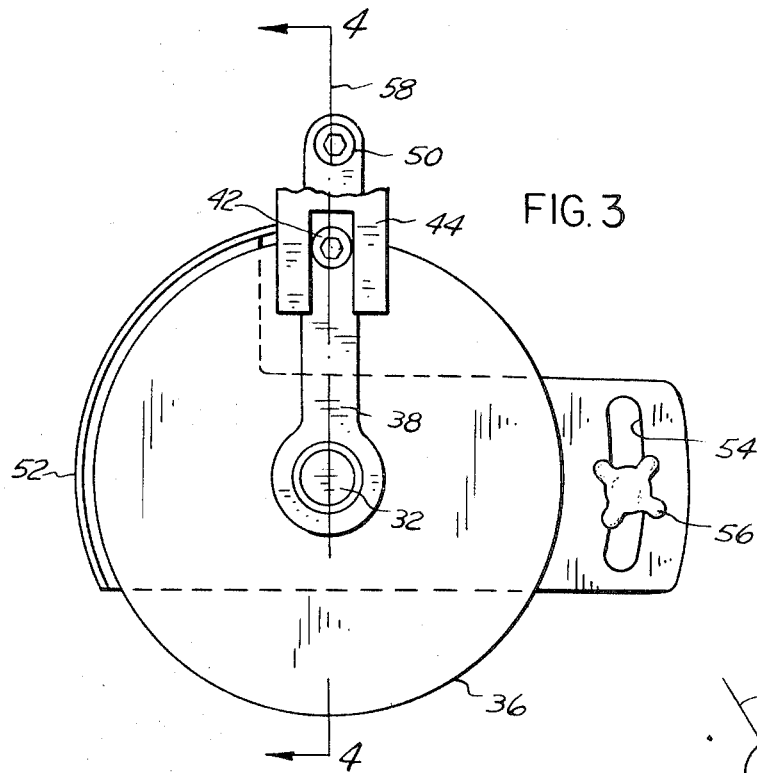
FIG. 3 is a front view of that portion of the machine of FIG. 1 which controls the advance of the grinding wheel.

Referring to FIGS. 1 and 2 of the drawings, there is illustrated a grinding machine for grinding workpieces 10, which may be cutting tool inserts or the like. The particular size, shape and type workpiece is not significant to the invention described below, the principal of operation of the device being applicable to a wide variety of workpieces. The mechanism described may also be used to control the advance of cutting as well as grinding operations.

Workpiece 10 is clamped between and rotatably driven by a pair of spindles 12, 14. A workpiece drive housing 16 is mounted at one end of traversing table 18 which is slidably mounted for lateral movement in base 20 of the machine. A schematically illustrated power source 22 provides the motive force for controlling the lateral traverse of table 18.

A rotating grinding wheel 24 is carried by shaft 26 extending from a grinding wheel drive housing 28. The entire grinding wheel assembly is mounted on grinding wheel table 30 which is slidably mounted on base 20 for movement into or away from the workpiece. The advance of grinding wheel table 30 is effected through the rotation of threaded drive shaft 32 (see FIGS. 1 and 4) which engages an internally threaded nut portion of table 30. Shaft 32 extends rearwardly through a clearance hole in base 20 from the front of the machine, where a hand wheel 34 and ratchet wheel 36 are keyed to it.

Ratchet arm 38 (FIGS. 3 and 4) is rotatably mounted on shaft 32 through an interposed bushing 40. The outer upper end of ratchet arm 38 has a roller follower 42 which rides in an inverted U-shaped slotted dog 44 which in turn is fixed to the front edge of traversing table 18 through a spacer 46. Hence, lateral movement of traversing table 18 causes ratchet arm 38 to freely pivot about drive shaft 32.

Figure 5:
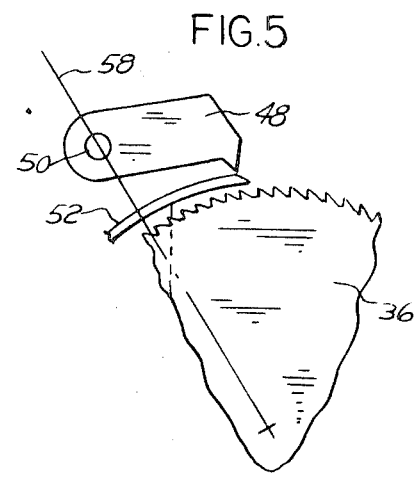
FIG. 5 is an enlarged fragmentary front view of the pawl and ratchet wheel portion of the mechanism of FIG. 3, with only the center line of the ratchet arm being shown, the arm being indexed approximately 30 degrees counter-clockwise from the position shown in FIG. 3.

Pawl 48 is pivotally mounted on a shoulder screw 50 in the inner upper end of ratchet arm 36. Since pawl 48 lies behind dog 44, it has been omitted from FIG. 3 for clarity. As best shown in FIGS. 4 and 5, the tooth of pawl 48 normally rests on a peripheral flange of ratchet shield 52 which is pivotally mounted on drive shaft 32. The angular position of shield 52 is adjustable, a slot 54 being provided through which a locking knob 56 projects into base 20.

Figure 4:
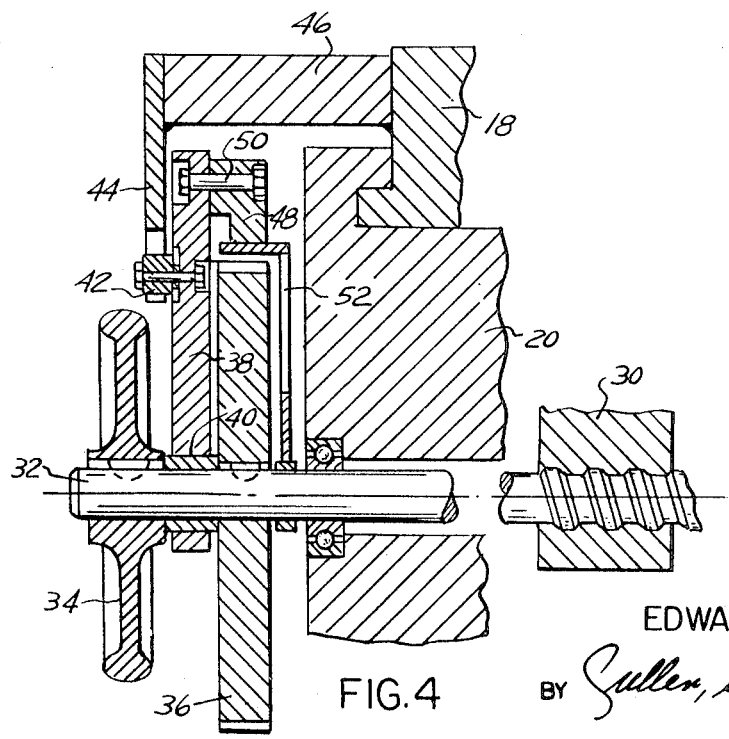
FIG. 4 is a sectional elevation of the mechanism of FIG. 3, viewed in the direction of arrows 4—4 of FIG. 3.

In FIG. 5, the center line 58 of ratchet arm 38 is arbitrarily shown pivoted approximately 30 degrees counterclockwise from the vertical position shown in FIG. 3. The illustrated setting of shield 52 is such as to hold pawl 48 up out of engagement with the teeth of ratchet wheel 36. It can be seen that any further clockwise movement of ratchet arm 38, representing rightward movement of dog 44 and table 18, will cause pawl 48 to drop off shield 52 and down into driving engagement with one of the teeth of ratchet wheel 36 to drive ratchet wheel 36 and drive shaft 32 in a clockwise direction.

Thus, the movement of traversing table 18 toward the right by power source 22 is the source of power for the advancement or feed of grinding wheel table 30. Leftward movement of table 18 produces no rotation of shaft 32, since pawl 48 is not effective in that direction. The position of grinding wheel table 30 can be controlled manually by hand wheel 34.

OPERATION

It will be seen from the above description that the rightward movement of traversing table 18 will not produce any clockwise rotation of drive shaft 32 or any advancement of grinding wheel 24 so long as pawl 48 is held out of engagement with ratchet wheel 36 by shield 52. However, once pawl 48 falls off of shield 52 into engagement with one of the teeth of ratchet wheel 36, continued rightward movement of table 18 will turn ratchet wheel 36 and drive shaft 32, to advance grinding wheel 24 into workpiece 10.

Thus, it is apparent that grinding wheel 24 continues to advance into workpiece 10 throughout the rightward movement of table 18, once pawl 48 engages ratchet wheel 36. This produces a gradually increasing depth of cut as the workpiece moves to the right past the grinding wheel. When table 18 moves toward the left, the setting of grinding wheel 24 remains constant, thus providing a polishing action, which also avoids any tendency for the grinding wheel to wear at an angle.

This pattern of feed is illustrated in FIG. 2. Depending on the relative widths of wheel 24 and workpiece 10, stock tends to be removed from triangle X as the workpiece traverses to the right. The leftward movement of the workpiece completes the stock removal from triangle Y.

The depth of stock removal on a given cycle of table 18 depends upon the position of shield 52. The more teeth exposed by shield 52, the sooner in the traversing cycle the grinding wheel begins to advance. By way of example, the following is a set of sample specifications: 12 threads per inch on grinding wheel drive shaft or lead screw 32; 360 teeth on ratchet wheel 36, which has a diameter of 8.3651 inches and a circumference of 26.2800 inches. The above specifications yield a ratchet tooth cord of .073 inch, and a grinding wheel advance of .0833 inch per revolution of the lead screw or .00023 inch per ratchet wheel tooth.

Hence, to determine the proper setting of ratchet wheel shield 52, the operator divides the desired distance of grinding wheel advance or feed by .00023. This calculation yields the number of teeth which the ratchet wheel should index as table 18 traverses. With that information, the operator merely sets the shield so that the point of drop of pawl 48 will result in an angular indexing of the wheel equal to that number of teeth in the remaining rightward stroke of traversing table 18.

Furthermore, as long as the traversing stroke is set to operate near a substantially vertical position of ratchet arm 38, the ratio of grinding wheel advance (i.e., the angle of rotation of ratchet wheel 36) to distance of traverse is substantially constant. For example, if the distance from the axis of shaft 32 to that of follower 42 is 4 inches, then each ⅛ inch of travel of table 18 from a starting position in which ratchet arm 38 is vertical results in the following number of degrees of rotation of drive shaft 32 (computed by the formula, sine of angle of arm 38 from vertical equals accumulated traverse distance divided by 4): 1°47'; 1°48'; 1°48'; 1°48'; 1°48'; 1°49';1°50'; 1°51'; 1°51'; 1°52'; 1°54'; 1°55'; 1°57'; 1°59' and 2°03' (rounding off to the nearest number of minutes). This is a remarkably constant relationship of distance of feed to that of traverse through a four inch traverse (two inches each side of vertical).

The above described invention thus provides an apparatus for achieving a precisely controlled gradual feed of a grinding or cutting tool, powered by the traversing movement of the workpiece. This results in more accurately finished workpieces, fewer rejections resulting from crumbling, and reduced and more uniform wear of the grinding wheel.

This invention may be further developed within the scope of the following claims. Accordingly, the above specification is to be interpreted as illustrative of only a single operative embodiment of this invention, rather than in a strictly limited sense.

I claim:
1. In a machine tool having a stock removing element for removing stock from a workpiece, including a base having a slidably mounted traversing table which supports the workpiece and which transports the workpiece laterally past the stock removing element, a feed table slidable on the base along an axis perpendicular to the lateral axis of movement of the traversing table and carrying the stock removing element, the depth of stock removal from the workpiece being regulated by the position of the feed table, means for controlling the rate and depth of stock removal comprising:

a drive shaft rotatably mounted in said machine base on an axis parallel to the axis of movement of said feed table and having a threaded portion which engages a nut portion of said feed table to cause said table to advance or withdraw relative to the workpiece when said drive shaft is rotated;

a toothed ratchet wheel keyed onto said drive shaft for rotation therewith;

a ratchet arm rotatably mounted on said drive shaft adjacent said ratchet wheel and pivotally mounting near its outer end a pawl which is engageable with the teeth of said ratchet wheel when said arm pivots in a first direction, said ratchet arm further carrying near its outer end a follower which engages a portion of said traversing table to cause said ratchet arm to pivot about said drive shaft in response to translational movement of said traversing table;

whereby said feed table advances proportionally to and in response to the movement of said traversing table, said ratchet arm-mounted pawl engaging said ratchet wheel to cause said ratchet wheel to rotate as said ratchet arm pivots in said first direction to follow said traversing table.

2. The machine tool of claim 1 which further comprises a shield adjustably positioned around said ratchet wheel, said shield covering a predetermined portion of the toothed periphery of said ratchet wheel to block said pawl from dropping into engagement with said ratchet wheel during a predetermined portion of the stroke of said traversing table, whereby the depth of advance of said feed table may be controlled by adjustment of the position of said shield.

References Cited
UNITED STATES PATENTS

| | | | |
|---|---|---|---|
| 250,665 | 12/1881 | Hyde. | |
| 915,128 | 3/1909 | Trefethen | 51—165 |
| 982,628 | 1/1911 | Norton | 51—165 |
| 1,016,585 | 2/1912 | Solem. | |

LESTER M. SWINGLE, Primary Examiner